L. P. Harris,
Evaporating Pan.
No. 239. A. 1. Patented May 31, 1859.
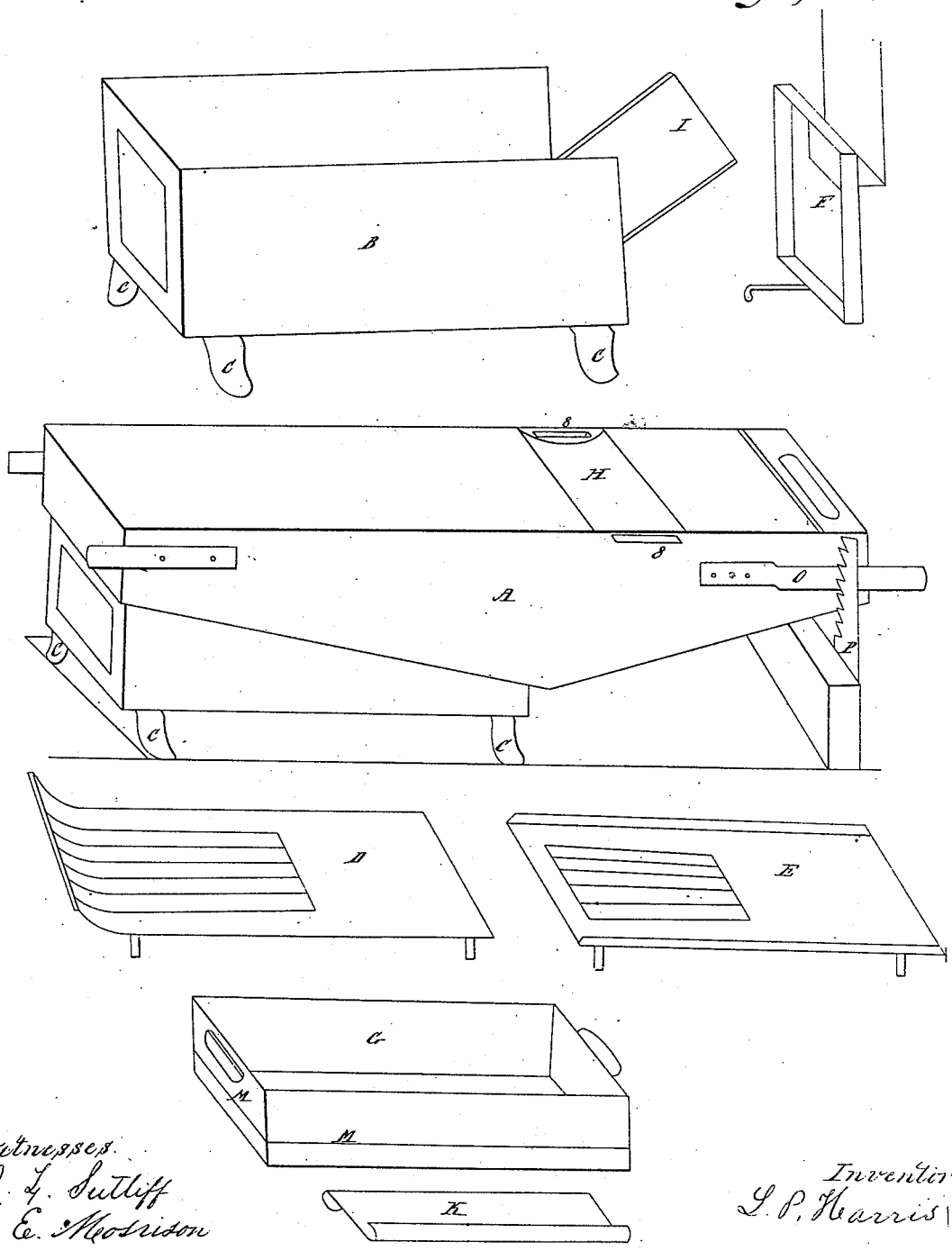
Witnesses.
O. L. Sutliff
J. E. Mosrison
Inventor
L. P. Harris
N. PETERS, PHOTO-LITHOGRAPHER, WASHINGTON, D. C.

UNITED STATES PATENT OFFICE.

LYMAN P. HARRIS, OF MANSFIELD, OHIO.

IMPROVEMENT IN APPARATUS FOR EVAPORATING SACCHARINE JUICES.

Specification forming part of Additional Improvement No. 239, dated May 31, 1859, to Letters Patent No. 22,648, dated January 18, 1859.

*To all whom it may concern:*

Be it known that I, L. P. HARRIS, of Mansfield, in the county of Richland, in the State of Ohio, have invented a new and Improved Mode of Constructing Apparatus for Evaporating Saccharine Juices; and I do hereby declare that the following is a full and exact description thereof, reference being had to the accompanying drawings, and to the letters of reference marked thereon.

The nature of my invention consists, first, in applying one or more dampers, H, to the movable furnace A; second, in constructing the movable flue I of two separate pieces; third, in providing the broad hook K, upon which the front end of the furnace rests.

To enable others skilled in the art to make and use my invention, I will proceed to describe its construction and operation.

I construct the heater, the channeled evaporator, and strainer as originally described. I construct the movable furnace as originally described, removing, however, a portion of the lower corners at each end; but for the purpose of forming a cooling-surface for the further skimming and cleansing of the cane-juice after it leaves the heater, I apply the concave plate or damper H near the top edge of and extending across the furnace, so that its edges fit closely up against the bottom of the evaporator. I then make an opening through each side of the furnace 8, above the bottom of this damper H, and apply movable slides or valves, which, being drawn, admits a current of cool air between the damper H and bottom of the evaporator, thus cooling its surface and stopping the boiling on that portion of the evaporator directly above the damper, which allows the scum to rise to the top of the liquid, when it may be removed. I then elevate the valve connected with that part of the evaporator, and allow the juice to flow through the strainer there located and pass along the channel to the point of escape into the cooler.

As an improvement in the adjustment of the furnace upon the fire-place, I apply the broad hook K, upon which the furnace rests at the head of the fire-place.

As an improvement upon the movable flue I, I construct it of two separate pieces, one being attached as a bottom to the back end of the furnace, the other, I, being movably attached to the back end of the fire-place and extending back, so as to lap onto the piece attached to the furnace, thus admitting of the necessary motion.

What I claim as my invention, and desire to secure by Letters Patent, is—

1. The application of one or more dampers, H, to the movable furnace A, also the cooling-surface on the evaporator connected therewith, for the purposes set forth.
2. The movable flue I, as described.
3. The broad hook or supporter K, or its equivalent, as set forth.

L. P. HARRIS.

Witnesses:
I. E. MORRISON,
O. L. SUTLIFF.